US011888591B2

(12) United States Patent
Page et al.

(10) Patent No.: US 11,888,591 B2
(45) **Date of Patent: *Jan. 30, 2024**

(54) SYSTEMS AND METHODS FOR COVERT COMMUNICATIONS

(71) Applicant: THE MITRE CORPORATION, McLean, VA (US)

(72) Inventors: Mark A. Page, Littleton, MA (US); Steen A. Parl, Arlington, MA (US); Scott Zhao, Somerville, MA (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,855

(22) Filed: Feb. 25, 2022

(65) Prior Publication Data

US 2023/0053475 A1 Feb. 23, 2023

Related U.S. Application Data

(63) Continuation of application No. 16/925,136, filed on Jul. 9, 2020, now Pat. No. 11,296,814.

(60) Provisional application No. 62/872,493, filed on Jul. 10, 2019.

(51) Int. Cl.
*H04K 3/00* (2006.01)

(52) U.S. Cl.
CPC .............. *H04K 3/825* (2013.01); *H04K 3/65* (2013.01); *H04K 2203/32* (2013.01); *H04K 2203/34* (2013.01)

(58) Field of Classification Search
CPC .. H04K 2203/32; H04K 2203/34; H04K 3/65; H04K 3/825
USPC ............................ 455/1, 63.1; 375/267, 285
See application file for complete search history.

(56) References Cited

U.S. PATENT DOCUMENTS 4,317,214 A 2/1982 Attinello
5,185,608 A 2/1993 Pozgay
5,313,209 A * 5/1994 Michaels, Jr. ........... H04K 3/42 342/13
6,184,820 B1 2/2001 Kratzer
8,055,184 B1 * 11/2011 DiMartino ............ H04K 3/825 235/382
10,868,609 B1 12/2020 Kossin
11,296,814 B2 * 4/2022 Page ...................... H04K 3/825
2006/0251182 A1 * 11/2006 Colak .................. G08G 1/0175 375/267
2010/0067608 A1 * 3/2010 Tyree .................... F41G 7/2246 375/259
2010/0304680 A1 12/2010 Kuffner
2013/0299586 A1 11/2013 Yesil
2014/0206279 A1 7/2014 Immendorf
2016/0341814 A1 11/2016 Nguyen
2017/0192089 A1 7/2017 Parker
(Continued)

*Primary Examiner* — Tan H Trinh
(74) *Attorney, Agent, or Firm* — PEARL COHEN ZEDEK LATZER BARATZ LLP

(57) ABSTRACT

A communications system and methods for covert communications are provided. A first transmitter that transmits an information carrying signal to a target receiver, a second transmitter and a third transmitter transmit jamming signals to the target receiver, such that the information carrying signals and the jamming signals are interleaved when received by the target receiver The information carrying signals and the jamming signals can be at least partially overlapping by an eavesdropper.

16 Claims, 5 Drawing Sheets

(56) References Cited

U.S. PATENT DOCUMENTS

| | | | | |
|---|---|---|---|---|
| 2018/0267144 | A1 | 9/2018 | Lin | |
| 2019/0020504 | A1 | 1/2019 | Ray | |
| 2019/0200356 | A1* | 6/2019 | DiGregory, Jr. | H04K 3/25 |
| 2019/0372240 | A1 | 12/2019 | Garrec | |
| 2020/0358550 | A1* | 11/2020 | Pierson | H04W 4/80 |
| 2021/0075403 | A1 | 3/2021 | Hili | |
| 2021/0190897 | A1 | 6/2021 | Cribbs, III | |
| 2021/0409146 | A1* | 12/2021 | Lee | H04K 3/00 |

* cited by examiner

SYSTEMS AND METHODS FOR COVERT COMMUNICATIONS

CROSS REFERENCE TO RELATED APPLICATIONS

This continuation application claims priority to and the benefit of U.S. patent application No. 16/925,136, filed on Jul. 9, 2020 and U.S. Provisional Patent Application No. 62/872,493, filed on Jul. 10, 2019, the entire contents of which are owned by the assignee of the instant application and incorporated herein by references in their entirety.

GOVERNMENT RIGHTS IN THE INVENTION

This invention was made with government support under W56KGU-17-C-0010 and W56KGU-18-D-0004/000. The government has certain rights in the invention.

FIELD OF THE INVENTION

The invention relates generally to communications systems. In particular, the invention relates to communication systems where interception by one or more unauthorized individuals is not desired (e.g., in battle scenarios and/or to protect privacy).

BACKGROUND

Communication systems can consist of transmitters and receivers. Some communications systems can be used in contexts where it is desirable to prevent unauthorized listeners from eavesdropping on the communication (e.g., in war). Some communication systems transmit data that is digitally or analog modulated.

Covert communications can be described as a communication techniques that enable transmitters to send a messages to an authorized receivers while preventing eavesdroppers from understanding the messages.

Current covert communication systems may use Transmission Security (TRANSEC) techniques such as Frequency Hopped Spread Spectrum (FHSS) and Direct Sequence Spread Spectrum (DSSS) to prevent an eavesdropper from intercepting a message. In some situations these TRANSEC techniques may be insufficient in preventing the eavesdropper from intercepting the message.

SUMMARY OF THE INVENTION

Advantages of the invention can include preventing covert signals from being received in certain spatial areas while simultaneously allowing the covert signals to be received in other spatial areas.

In one aspect, the invention involves a communications system for covert communications. The communications system includes a first transmitter that transmits an information carrying signal to a target receiver. The communications system also includes a second transmitter that transmits a first jamming signal to the target receiver, the second transmitter positioned at a first predetermined distance from the first transmitter. The communications system also includes a third transmitter that transmits a second jamming signal to the target receiver, the second transmitter positioned at a second predetermined distance from the first transmitter, wherein the first transmitter, the second transmitter and the third transmitter each transmit their respective information carrying signal, first jamming signal and second jamming signal such that the information carrying signal, first jamming signal and second jamming signal are interleaved when received by the target receiver.

In some embodiments, the communications system also includes a non-target receiver, wherein the first information carrying signal, the second jamming signal and the third jamming signal are at least partially overlapped when received by the non-target receiver. In some embodiments, the first transmitter, the second transmitter and the third transmitter each transmit with the same pulse repetition interval (T).

In some embodiments, wherein the first transmitter, the second transmitter, and the third transmitter each transmit for a duration equal to the pulse repetition interval (T) divided by three. In some embodiments, wherein the first transmitter, the second transmitter, and the third transmitter transmit its respective pulse starting at $t_i=\tau_i-(i-1)T/N$, where i=1, 2, and 3, and each of the first transmitter, the second transmitter, and the third transmitter repeat its respective pulse every T seconds, where $\tau_i$ is a propagation delay between the respective transmitter and the target receiver and N is the number of transmitters.

In some embodiments, wherein the pulse repetition interval (T) is less than an integration time of the target receiver. In some embodiments, wherein the pulse repetition interval (T) is greater than a sampling rate of the target receiver.

In another aspect, the invention involves a method for covert communications. The method involves transmitting, via a first transmitter, an information carrying signal to a target receiver. The method also involves transmitting, via a second transmitter, a first jamming signal to the target receiver, the second transmitter positioned at a first predetermined distance from the first transmitter. The method also involves transmitting, via a third transmitter, a second jamming signal to the target receiver, the second transmitter positioned at a second predetermined distance from the first transmitter, wherein the first transmitter, the second transmitter and the third transmitter each transmit their respective information carrying signal, first jamming signal and second jamming signal such that the information carrying signal, first jamming signal and second jamming signal are interleaved when received by the target receiver.

In some embodiments, the method involves receiving, via a non-target receiver, the first information carrying signal, the second jamming signal and the third jamming signal, wherein the first information carrying signal, the second jamming signal and the third jamming signal are at least partially overlapped when received by the non-target receiver.

In some embodiments, the method involves transmitting via the first transmitter, the second transmitter and the third transmitter with the same pulse repetition interval (T). In some embodiments, wherein the first transmitter, the second transmitter, and the third transmitter each transmit for a duration equal to the pulse repetition interval (T) divided by three.

In some embodiments, wherein the first transmitter, the second transmitter, and the third transmitter transmit its respective pulse starting at $t_i=\tau_i-(i-1)T/N$ , where i=1, 2, and 3, and each of the first transmitter, the second transmitter, and the third transmitter repeat its respective pulse every T seconds, where $\tau_i$ is a propagation delay between the respective transmitter and the target receiver, and N is the number of transmitters.

In some embodiments, wherein the pulse repetition interval (T) is less than an integration time of the target receiver.

In some embodiments, wherein the pulse repetition interval (T) is greater than a sampling rate of the target receiver.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

Figure 1:
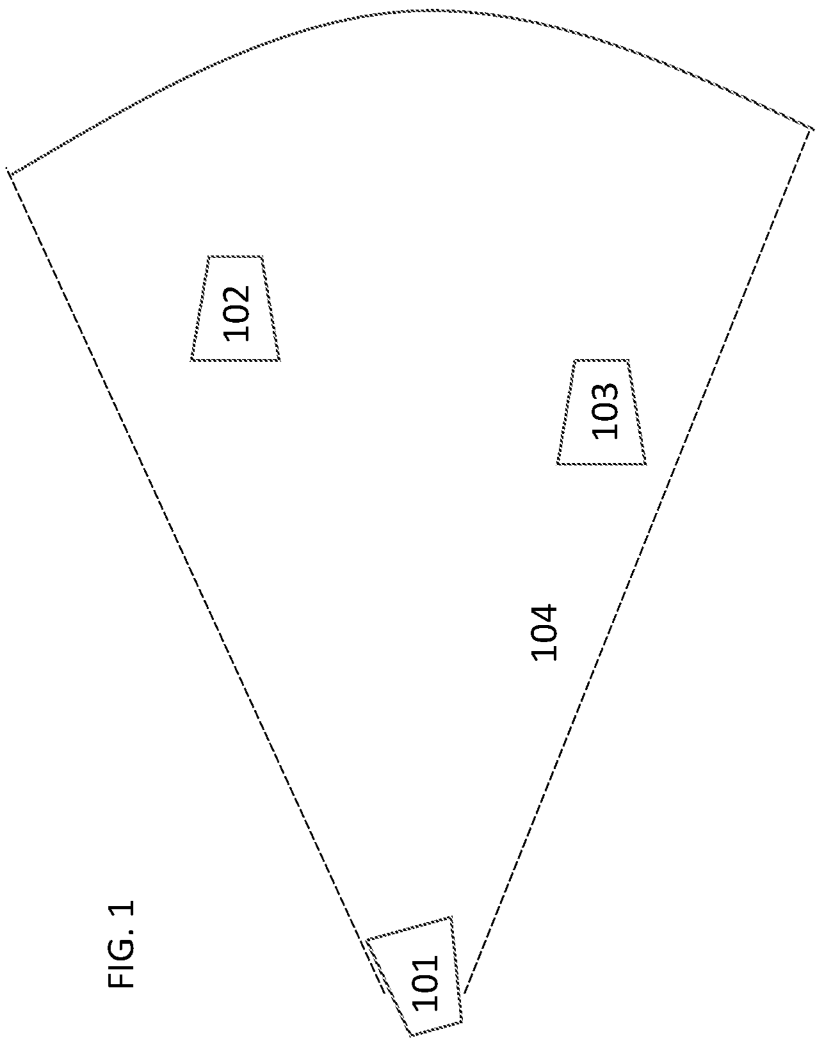
FIG. 1 is a diagram of a communications system, according to the prior art.

FIG. 1 is a diagram of a communications system according to the prior art. FIG. 1 illustrates an example of a communications system 101 (e.g., a transmitter) with two additional communication systems 102 and 103 (e.g. two receivers), respectively, within a transmission area 104 of the communications system 101. The transmission area 104 can be a geographical area that signals transmitted by the communications system 101 can be received by a receiver (e.g., as limited by signal strength of the signals emitted from the transmitter 101). The transmitter 101 can be instructed to operate such that it is instructed to communicate only with receiver 102, but the receiver 103 being within the transmission range of the transmitter 101 can receive signals transmitted by the transmitter 101 and eavesdrop on the signals transmitted to the receiver 102.

Figure 2:
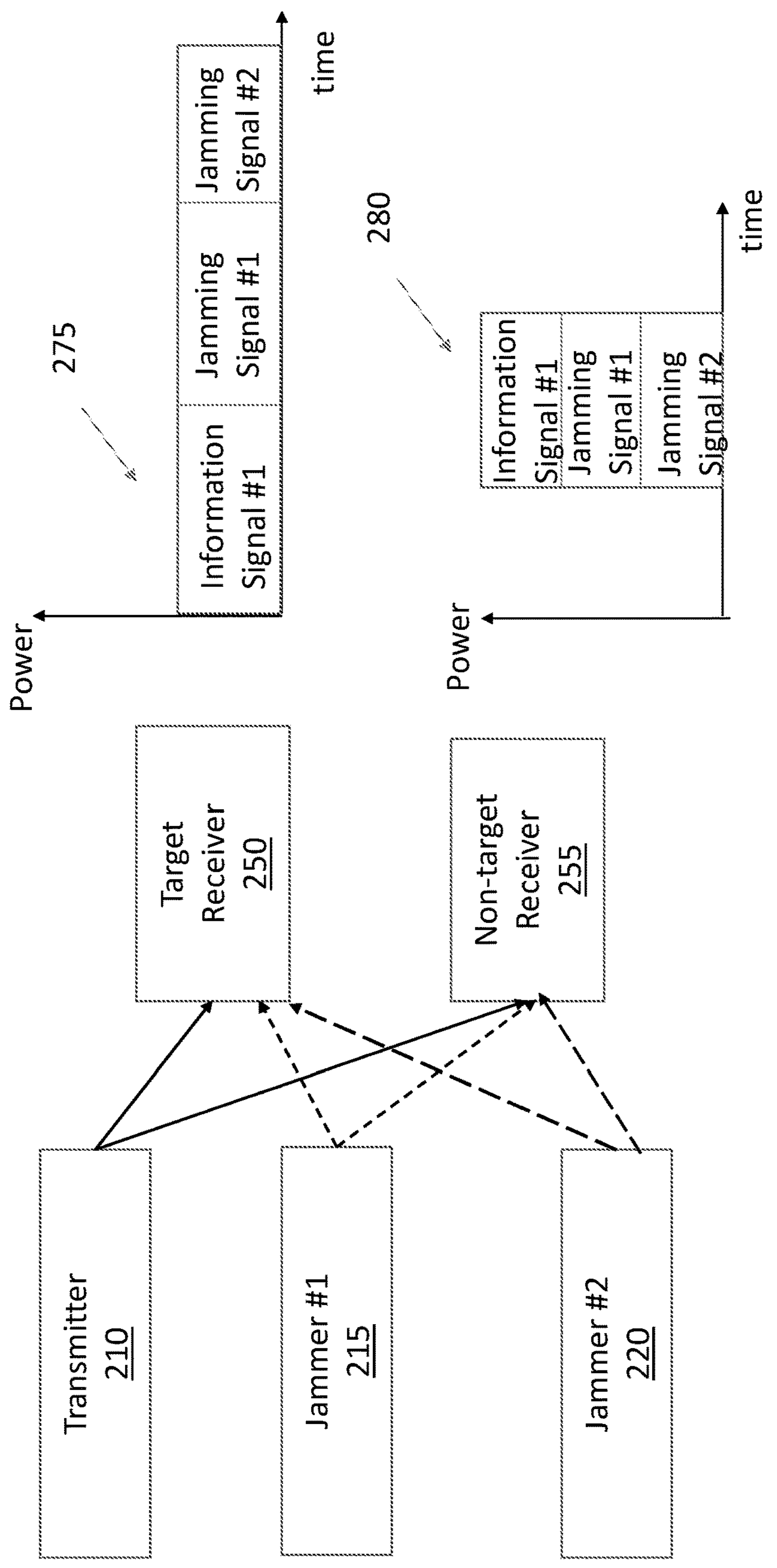
FIG. 2 is a diagram of a covert communications system, according to some embodiments of the invention.

FIG. 2 is a diagram of a covert communications system, according to some embodiments of the invention. The covert communications system includes a first transmitter 210, a second transmitter 215 (e.g., a first jammer), and a second transmitter 220 (e.g., a second jammer). The first jammer 215 can be positioned relative to the first transmitter 210 at a first predetermined distance. The second jammer 220 can be positioned relative to the first transmitter 210 at a second predetermined distance. The first predetermined distance and/or the second predetermined distance can be based on an expected range to the target receiver 250.

During operation, the transmitter 210 can transmit an information carrying signal to the target receiver 250. The first jammer 215 can transmit a first jamming signal to the target receiver 250 and the second jammer 220 can transmit a second jamming signal to the target receiver 250. The transmitter 210 can transmit (e.g., emit) the information carrying signal as a pulsed communication signal of duration $$\frac{T}{N}$$

with periodicity T at a first time $t_1$, where N is the total number of transmitter (e.g., N=three (3) in FIG. 2, transmitter 210, first jammer 215 and second jammer 220). The first jammer 215 and the second jammer 220 can each transmit pulsed jamming signals of duration $$\frac{T}{N}$$

with periodicity T, at a second time, $t_2$, and at a third time $t_3$, respectively, where $t_1$, $t_2$ and $t_3$ are selected such that the total interval $t_1$ to $t_2$, $t_2$ to $t_3$ and $t_3$ to $t_1$ equals T at the target receiver 250.

Upon receipt of the signals from the transmitter 210, the first jammer 215 and the second jammer 220, as can be seen in the timing diagram 275, the pulsed signals interleave to form a 100% duty cycle waveform.

Upon receipt of the signals from the transmitter 210, the first jammer 215 and the second jammer 220 by the non-target receiver 255, due to, for example, the difference in location of the non-target receiver 255 with respect to the target receive 250, the information carrying signal, the first jamming signal and the second jamming signal can be received all at the same time (or substantially the same time), as is shown in timing diagram 280. Receiving the information carrying signal, the first jamming signal and the second jamming signal at substantially the same time can cause the information carrying signal to be overpowered by the first and second jamming signals such that the non-target receiver 255 may not be able to distinguish the information carrying signal.

In various embodiments, the non-target receiver 255 is positioned such that the information carrying signal, the first jamming signal and the second jamming signal are received such that they overlap in a manner other then as depicted in timing diagram 280, and the information carrying signal is indistinguishable from the first jamming signal and the second jamming signal.

The number of jammers shown in FIG. 2 is an example only, and there can be n number of jammers, were n is an integer. In some embodiments, there are k transmitters, where k is an integer. In some embodiments, there are m jammers, where m is an integer. In some embodiments, there are x non-target receivers, where x is an integer.

For a given system configuration (e.g., m jammers, k transmitters, and x non-target receivers and the target receiver), the location of the target receiver can receive the information carrying signal and jamming signals sequentially within a given pulse repetition interval. The non-target receivers can receive the communications and jamming signals in an overlapped manner as described above with respect to FIG. 2, or in other embodiments, the non-target receivers can receive the communications and jamming signals with partial overlap. The amount of overlap between the communications and jamming signals can depend upon distance between the target receiver and the non-target receivers and/or a number of jammers in the configuration. In various embodiments, if it is expected that non-target receivers are positioned within a predetermined radius of the target receiver, where the predetermined radius is an area where the information carrying signals and the jamming signals do not substantially overlap, the number of jammers can be increased.

In various embodiments, the number of jamming systems is based on a desired area for overlapping communications and jamming signals.

In various embodiments, a duty cycle of each transmitter varies based on a number of transmitters in the system.

The information carrying signals and jamming signals can be transmitted in a particular order. For example, for a particular pulse repetition interval, the information carrying signals can be transmitted first and the jamming signal can be transmitted second. For a system with multiple jammers, the order to transmit the jamming signal can be based on a distance between the particular jammer and the target receiver. For example, a jammer that is positioned closest to the target receiver can transmit second, and the next closest third, etc.

The transmitter 210, the first jamming system 215 and the second jamming system 220 can each include one or more antennas, processors, wireless communication devices, controllers, and/or other components as are known in the art for transmitters, jammers, and/or communication systems. The transmitter 210, first jamming system 215 and/or second jamming system 220 can be wirelessly and/or wire coupled to communicate to one another and/or with a control center (not shown). Various parameters used during operation of the transmitter, first jamming system 215 and/or second jamming system 220 can be hard coded, and/or modified via inputs as is known in the art.

Figure 3:
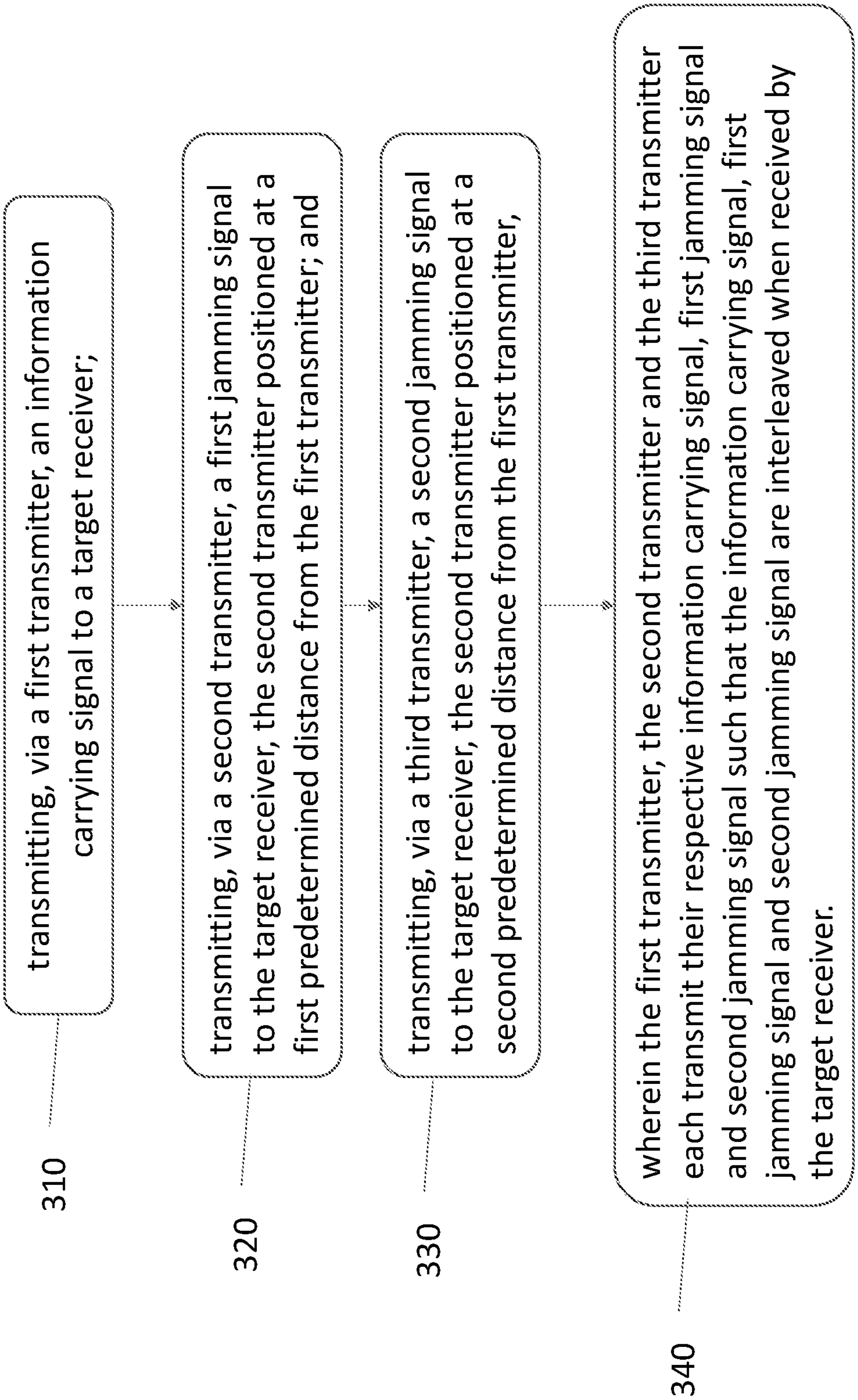
FIG. 3 is a flow chart of a method for covert communications, according to some embodiments of the invention.

FIG. 3 is a flow chart of a method for covert communications, according to some embodiments of the invention. The method involves transmitting, via a first transmitter (e.g., transmitter 210 as described above in FIG. 2), an information carrying signal to a target receiver (e.g., target receiver 250 as described above in FIG. 2).

The method also involves transmitting, via a second transmitter (e.g., first jammer 215 as described above in FIG. 2), a first jamming signal to the target receiver, the second transmitter positioned at a first predetermined distance from the first transmitter.

The method also involves transmitting, via a third transmitter (e.g., second jammer 220 as described above in FIG. 2) a second jamming signal to the target receiver, the third transmitter positioned at a second predetermined distance from the first transmitter, wherein the first transmitter, the second transmitter and the third transmitter each transmit their respective information carrying signal, first jamming signal and second jamming signal such that the information carrying signal, first jamming signal and second jamming signal are interleaved when received by the target receiver. For example, turning to FIG. 4, FIG. 4 is an example of a diagram showing multiple transmitters and a target receiver and an example of transmit and receive start and stop pulse timing, such that interleaving occurs, according to some embodiments of the invention.

Figure 4:
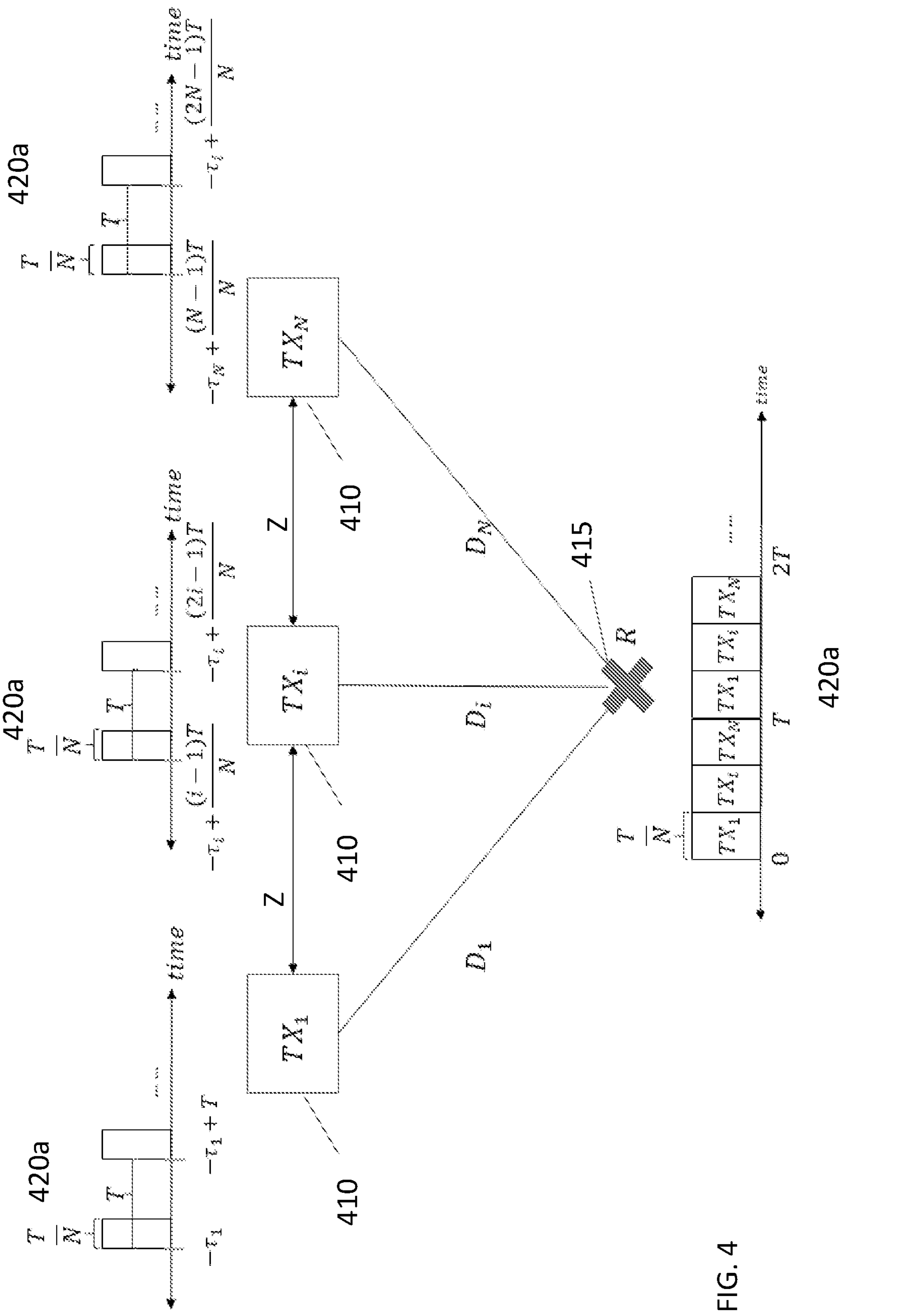
FIG. 4 is an example of a diagram showing multiple transmitters and a target receiver, according to some embodiments of the invention.

As shown in FIG. 4, each transmitter 410, $TX_1$. TXi, . . . $TX_N$, can transmit to a target receiver R 415. A transmit time can be determined for each transmitter 410 such that the signals are received by the target receiver R 415 in an interleaved manner. For N transmitters 410 spaced Z meters apart, targeting a receiver R 415, there can be a propagation delay, $\tau_i$ for i=1,2 . . . N represents the propagation delay from the Nth transmitter to the receiver R. The propagation delay can be the distance $D_i$ between the particular respective transmitter 410 and the target transmitter R 415, divided by c, the speed of light.

Each transmitter 410 can transmit a pulse of duration T/N, every T seconds, where T is the pulse repetition interval (PRI). The pulse duty cycle (PDC) of each transmitter 410 is 1/N. The $i^{th}$ transmitter 410 can transmit its respective pulse starting at $t_i=\tau_i-(i-1)T/N$ and can repeat that pulse every T seconds. This can cause the pulses from each respective transmitter 410 to interleave at the receiver 415 to form a 100% (or substantially) duty cycle waveform.

In various embodiments, the pulse repetition interval (PRI) for any of the transmitters 410 can meet any or all of the following criteria:

1.) The pulse repetition interval can be less than a particular target receiver's integration time.
2.) The pulse repetition interval can be greater than the particular target receiver's sampling rate.
3.) For marginal spatial selectivity (e.g., varying duty cycle based on location), T can be chosen such that $$\frac{T}{N}c \leq Z,$$

where c is the speed of light. If $$Z \ll \frac{T}{N}c$$

then all points in space can experience nearly the same pulse pattern:

a. For optimal spatial selectivity T can be chosen such that $Tc \leq Z$

The transmitters, receivers, and communications system can be of any type as is known in the art. As is apparent to one of ordinary skill in the art, transmitters and receivers can include one or more components that can include one or more antennas and one or more processors. The processors can include code/components/modules that control the antenna operation and that can receive and process electromagnetic signals and transmit electromagnetic signals.

Figure 5:
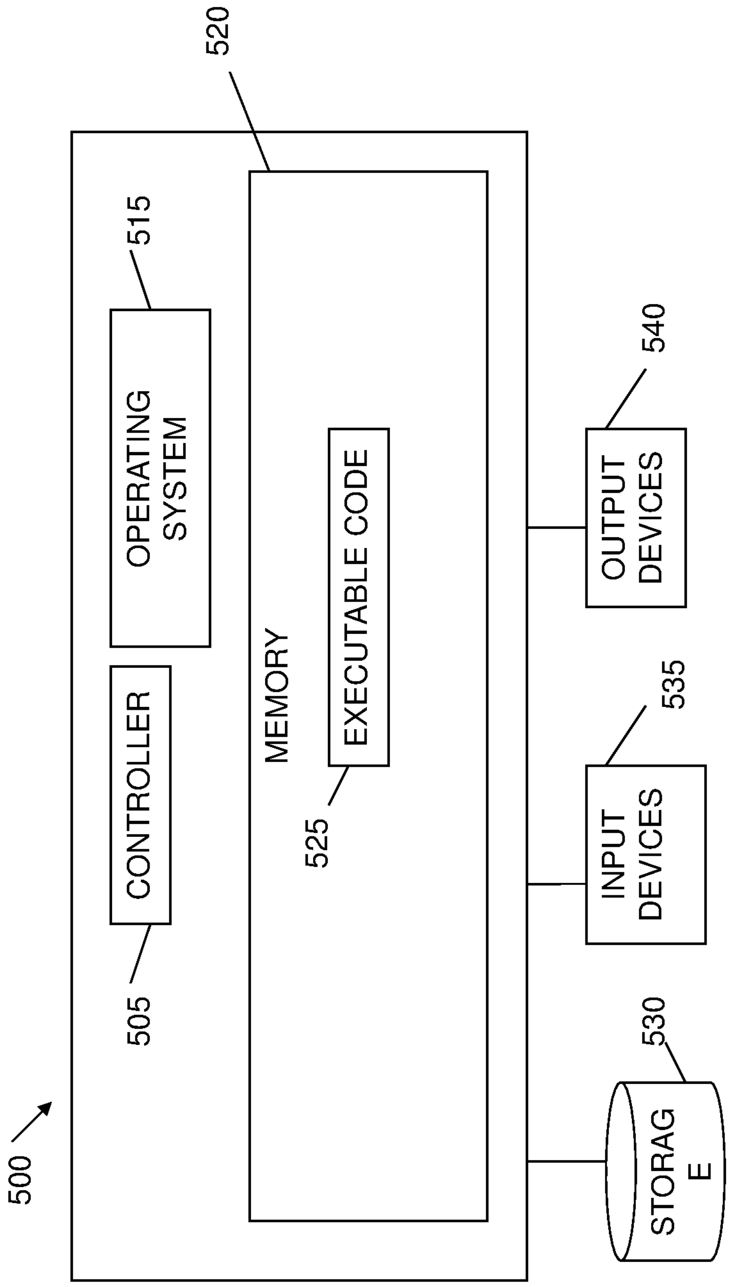
FIG. 5 is a high-level block diagram of an exemplary computing device which can be used with embodiments of the invention.

FIG. 5 is a high-level block diagram of an exemplary computing device which can be used with embodiments of the invention, for example, as part of a radar system as described above. Computing device 500 can include a controller or processor 505 that can be or include, for example, one or more central processing unit processor(s) (CPU), one or more Graphics Processing Unit(s) (GPU or GPGPU), a chip or any suitable computing or computational device, an operating system 515, a memory 520, a storage 530, input devices 535 and output devices 540. Each of modules and equipment such as processors, modules, boards, integrated circuits, and other equipment mentioned herein can be or include a computing device such as included in FIG. 1 and FIG. 2, although various units among these entities can be combined into one computing device.

Operating system 515 can be or can include any code segment designed and/or configured to perform tasks involving coordination, scheduling, arbitration, supervising, controlling or otherwise managing operation of computing device 500, for example, scheduling execution of programs. Memory 520 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 can be or can include a plurality of, possibly different memory units. Memory 520 can store for example, instructions to carry out a method (e.g. code 525), and/or data such as user responses, interruptions, etc.

Executable code 525 can be any executable code, e.g., an application, a program, a process, task or script. Executable code 525 can be executed by controller 505 possibly under control of operating system 515. For example, executable code 525 can when executed cause the antenna's to emit radiation and/or receive radiation for processing according to embodiments of the invention. In some embodiments, more than one computing device 500 or components of device 500 can be used for multiple functions described herein. For the various modules and functions described herein, one or more computing devices 500 or components of computing device 500 can be used. Devices that include components similar or different to those included in computing device 500 can be used, and can be connected to a network and used as a system. One or more processor(s) 505 can be configured to carry out embodiments of the invention by for example executing software or code. Storage 530 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 530 and can be loaded from storage 530 into a memory 520 where it can be processed by controller 505. In some embodiments, some of the components shown in FIG. 4 can be omitted.

Input devices 535 can be or can include for example a mouse, a keyboard, a touch screen or pad or any suitable input device. It will be recognized that any suitable number of input devices can be operatively connected to computing device 500 as shown by block 535. Output devices 540 can include one or more displays, speakers and/or any other suitable output devices. As is recognized, any suitable number of output devices can be operatively connected to computing device 500 as shown by block 540. Any applicable input/output (I/0) devices can be connected to computing device 500, for example, a wired or wireless network interface card (NIC), a modem, printer or facsimile machine, a universal serial bus (USB) device or external hard drive can be included in input devices 535 and/or output devices 540.

Embodiments of the invention can include one or more article(s) (e.g. memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A communications system for covert communications, the communications system comprising:

a first transmitter that transmits an information carrying signal to a target receiver;

a second transmitter that transmits a first jamming signal to the target receiver, the second transmitter positioned at a first predetermined distance from the first transmitter; and a third transmitter that transmits a second jamming signal to the target receiver, the second transmitter positioned at a second predetermined distance from the first transmitter, wherein the first transmitter, the second transmitter and the third transmitter each transmit their respective information carrying signal, first jamming signal and second jamming signal such that the information carrying signal, first jamming signal and second jamming signal are interleaved when received by the target receiver.

2. The communications system of claim 1 further comprising a non-target receiver, wherein the first information carrying signal, the second jamming signal and the third jamming signal are at least partially overlapped when received by the non-target receiver.

3. The communications system of claim 1, wherein the first transmitter, the second transmitter and the third transmitter each transmit with the same pulse repetition interval (T).

4. The communications system of claim 3, wherein the first transmitter, the second transmitter, and the third transmitter each transmit for a duration equal to the pulse repetition interval (T) divided by three.

5. The communications system of claim 4 wherein the first transmitter, the second transmitter, and the third transmitter transmit its respective pulse starting at $t_i=\tau_i-(i-1)T/N$, where i=1, 2, and 3, and each of the first transmitter, the second transmitter, and the third transmitter repeat its respective pulse every T seconds, where $\tau_i$ is a propagation delay between the respective transmitter and the target receiver and N is the number of transmitters.

6. The communications system of claim 3 wherein the pulse repetition interval (T) is less than an integration time of the target receiver.

7. The communication system of claim 3 wherein the pulse repetition interval (T) is greater than a sampling rate of the target receiver.

8. A method for covert communications, the method comprising:

transmitting, via a first transmitter, an information carrying signal to a target receiver;

transmitting, via a second transmitter, a first jamming signal to the target receiver, the second transmitter positioned at a first predetermined distance from the first transmitter; and transmitting, via a third transmitter, a second jamming signal to the target receiver, the second transmitter positioned at a second predetermined distance from the first transmitter, wherein the first transmitter, the second transmitter and the third transmitter each transmit their respective information carrying signal, first jamming signal and second jamming signal such that the information carrying signal, first jamming signal and second jamming signal are interleaved when received by the target receiver.

9. The method of claim 8 further comprising receiving, via a non-target receiver, the first information carrying signal, the second jamming signal and the third jamming signal, wherein the first information carrying signal, the second jamming signal and the third jamming signal are at least partially overlapped when received by the non-target receiver.

10. The method of claim 8, further comprising transmitting via the first transmitter, the second transmitter and the third transmitter with the same pulse repetition interval (T).

11. The method of claim 10, wherein the first transmitter, the second transmitter, and the third transmitter each transmit for a duration equal to the pulse repetition interval (T) divided by three.

12. The method of claim 11 wherein the first transmitter, the second transmitter, and the third transmitter transmit its respective pulse starting at t. sub. i=τ. sub.i−(i−1)T/N , where i=1, 2, and 3, and each of the first transmitter, the second transmitter, and the third transmitter repeat its respective pulse every T seconds, where τ. sub.i is a propagation delay between the respective transmitter and the target receiver, and N is the number of transmitters.

13. The method of claim 10 wherein the pulse repetition interval (T) is less than an integration time of the target receiver.

14. The method of claim 10 wherein the pulse repetition interval (T) is greater than a sampling rate of the target receiver.

15. The communications system of claim 1 wherein the pulse repetition interval (T) is less than the target receiver's integration time.

16. The communications system of claim 1 wherein the pulse repetition interval (T) is greater than the target receiver's sampling rate.

* * * * *